United States Patent [19]

Blumenthal et al.

[11] 4,104,648

[45] Aug. 1, 1978

[54] ELECTRIC SPARK RECORDING

[75] Inventors: John Blumenthal, Wickliffe; Arling Dix Brown, Jr., Cleveland Heights, both of Ohio

[73] Assignee: Gould Inc., Rolling Meadows, Ill.

[21] Appl. No.: 704,373

[22] Filed: Jul. 12, 1976

[51] Int. Cl.² .................... G01D 15/08; G01D 9/32
[52] U.S. Cl. ................................. 346/163; 33/23 C; 346/29
[58] Field of Search ............ 33/23 C, 18 C; 346/162, 346/163, 29

[56] References Cited

U.S. PATENT DOCUMENTS

| | | | |
|---|---|---|---|
| 3,377,598 | 4/1968 | Borman | 346/162 |
| 3,593,615 | 7/1971 | Shelton | 33/23 C |
| 3,675,333 | 7/1972 | Wilson | 33/23 C |
| 3,803,635 | 4/1974 | Andree | 346/163 |
| 3,816,839 | 6/1974 | Honda | 346/163 |
| 3,998,315 | 12/1976 | Phillips | 346/163 |

Primary Examiner—Jay P. Lucas

Attorney, Agent, or Firm—Eber J. Hyde; Charles E. Snee, III

[57] ABSTRACT

A graphic recording technique is disclosed for the enlargement of a relief configuration. A micro-stylus is used to scan the configuration laterally while measuring vertical irregularities in the surface; and a recorder stylus is synchronized therewith to record the scan. A series of scans are provided where each successive scan is offset from the previous scan to produce a topographical representation of the relief configuration from the recorder stylus. Vertical movements of the micro-stylus along the surface of the relief configuration are reproduced by the recorder stylus as movements on the ordinate axis in combination with the scan offset thus producing a two dimensional graphical display of a three dimensional relief configuration. Hidden contours of the relief configuration are accurately suppressed by causing the recorder stylus to stop recording at the boundary of a previously written scan area and to begin recording once the previously recorded area has been departed.

2 Claims, 5 Drawing Figures

4,104,648

ELECTRIC SPARK RECORDING

BACKGROUND OF THE INVENTION

1. Field of the Invention

The invention pertains generally to the recording of graphical displays for three dimensional objects and is more particularly directed to providing a technique for generating graphical representations without displaying hidden lines.

2. Prior Art

In scientific and engineering endeavors there is a continuing need for the accurate replication of microsurfaces by graphical displays. Enlarging the discontinuities and irregularities of these by graphical means allows personnel to study the characteristics and physical behavior of the materials forming the surfaces. Particularly, those investigating the surfaces of complex large scale integrated circuits and the surfaces of paper products have found this technique useful.

The science of micro-topography has until recently been at a disadvantage in not having an accurate and advantageous device for recording such representations. However, there has been developed an advantageous device capable of converting the three-dimensional motion of a micro-stylus into an enlarged two-dimensional graphical recording which appears to be three-dimensional.

This device uses a vertically sensitive micro-stylus transducer and an amplifier for scanning a specimen, coupled to a highly accurate X-Y recorder device. A precision reference carriage guides the micro-stylus linearly across the reference specimen to be studied in a series of closely spaced X-axis direction parallel tracks, and a precision carriage may be used to continuously or incrementally move the specimen slowly in the Y-axis direction during each trace. The X-Y recorder records the amplified traces of the micro-stylus across the reference specimen and the Z-axis motion of the micro-stylus is converted into an additional X- or Y-axis motion of the recording device to draw an apparent three-dimensional picture of the surface of the specimen. Alternatively, the specimen may remain fixed and the stylus partake of both the X-axis motion and the Y-axis motion; also the stylus may remain fixed and the specimen partake of both the X- and Y-axis motions.

A micro-topography device of this general description is more fully described in U.S. Pat. No. 3,675,333 issued July 11, 1972 to Gardner P. Wilson and assigned to Gould, Inc., the assignee of the present invention. The disclosure of the Wilson patent is hereby expressly incorporated by reference in the present description.

Many of the details of surfaces that are of interest to the micro-topographer may be difficult to describe or visualize in the two-dimensional topographical representations because of the "overwriting" of previously recorded scan lines. This phenomenon is caused by a subsequent scan line having an excursion on the ordinate axis which causes it to intersect a previously written scan line, thereby writing through or "overwriting" the previously written scan line. To provide a clear and acceptable graphic record of a relief configuration or specimen, it is therefore necessary to suppress these overwriting excursions as hidden or unseen lines.

In computer graphics the hidden line problem has been solved in the past by memorizing where each line has been written and not overwriting those lines already recorded. Normally this necessitates a block of memory and a special algorithm or the like to indicate where to start and stop the stylus of a recording device. This indirect control process is an expensive and time-consuming way of providing hidden line suppression capability. It would therefore be advantageous to provide a direct control writing technique to produce two-dimensional topographical representations of three-dimensional surfaces with hidden contours.

SUMMARY OF THE INVENTION

The invention pertains to a technique for recording a three-dimensional relief configuration as a two-dimensional topographical image having hidden contours. The invention includes a graphic recording device which receives each successive scan line representation of the three-dimensional image with each successive scan line offset from the previous scan line by a predetermined amount.

A terminal connection from a potential source is made at an extreme boundary of the surface of an arc erodable recording medium used by the recording device. The opposite terminal of the potential source is connected to the stylus of the recording device to develop a writing potential between the recording medium and the stylus. The writing potential produces an arc that erodes the surface and exposes a contrasting underlying base medium to produce a record trace as the recorder-stylus is moved relative to the surface. The medium on one side of the recorder trace is electrically isolated from the potential source, provided the trace extends clear across the medium.

The invention includes the initiation of the scanning along a boundary opposite that of the potential connection, with each lateral transversal proceeding from the beginning edge of the arc erodable surface to its opposite edge. The technique thereby provides a plurality of electrically isolated scan areas which are open circuited with respect to the recorder stylus and the potential source. This prevents the overwriting of a previously written scan line. Information which would be lost by this suppression may be recovered by inverting recording parameters and scan directions according to another aspect of the invention.

Therefore, it is an object of the invention to provide a direct control process to prevent the overwriting of previously written lines and to eliminate the problems and confusion resultant from overwriting effects known in the prior art.

This and other objects, features, and advantages of the present invention will be more fully understood and better appreciated upon reference to the following detailed description taken in conjunction with the appended drawings wherein:

DETAILED DESCRIPTION OF PREFERRED EMBODIMENT

Figure 1:
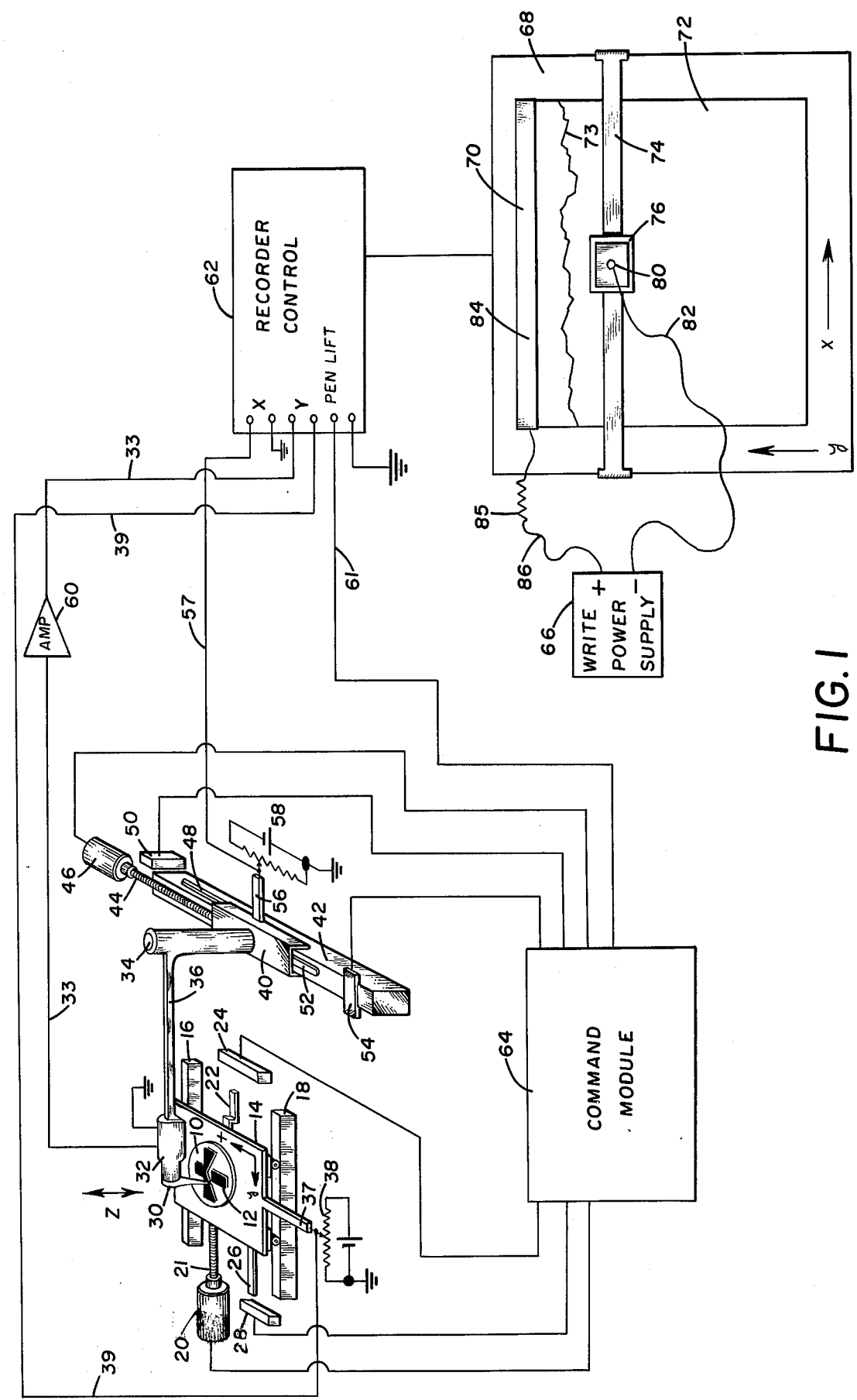
FIG. 1 is a partially pictorial and partially schematic system diagram of a linear trace, three-dimensional gaging and surface form measuring and recording apparatus constructed in accordance with the invention.

With reference now to the first figure of the drawings, there is illustrated a linear surface form measuring and graphic recording apparatus.

The graphic recording apparatus includes a level specimen table 14 on which a relief configuration 10 having contour areas 12 is mounted for inspection and recording.

The relief configuration 10 on the recording apparatus is generally a planar surface with the topographic contour areas 12 forming irregularities or hills and valleys therein. Illustrated is a disc with a pictorial pattern forming the contour areas 12. Generally, large scale integrated circuit chips and/or the surfaces of paper products are usefully investigated in this way.

The specimen table 14 is movable in the Y axis direction along a guideway 16 and a guideway 18 by the action of a motor 20 and a threaded shaft 21. The movement of the specimen table 14 is controlled by the limiting travel of an actuator finger 22 operating a limit switch 24 at one Y extreme and an actuator finger 26 operating a limit switch 28 at the other Y extreme. The table 14 may be moved slowly in the Y-direction or in increments for each lateral X-axis scan described hereinafter.

The position of the table 14 in the Y-direction is presented accurately as a voltage by having a potentiometer wiper 37 move along a potentiometer 38 coincidently with the table movement.

The relief configuration 10 is scanned in the X-direction by a micro-stylus 30 which is movable to touch all the contours of the configuration 10. The stylus 30 is attached to a transducer 32 sensitive to the vertical or Z-axis movement of the stylus as it moves over the configuration 10.

The transducer 32 converts the movement of the micro-stylus 30 into an electrical signal on a line 33 indicative of positive or negative vertical excursions of the stylus away from the surface which is used as a reference. The vertical axis movement of the micro-stylus is accomplished by mounting the stylus cantilevered from an arm 36 connected to a vertically reciprocal post 34. The post 34 rests on and is mounted to a base 40 that is movable along a guideway 42 by a motor 46 and a threaded shaft 44. The base 40 is direction limited at one extreme by an actuator finger 48 contacting a limit switch 50 and at the other extreme by an actuator finger 52 contacting a limit switch 54. The position of the micro-stylus in the X-direction is presented accurately as a voltage by having a potentiometer wiper 56 move along a potentiometer 58 coincidently with the stylus movement.

A command module 64 receives position information from the limit switches 24, 28, 50, and 54 and directs the scanning motors 20, 46 as to the direction and speed of the investigation. To prevent errors caused by backlash in the system the configuration 10 is generally scanned only in one direction for example, the positive X-direction, while the table is incremented in the Y-direction. The signals generated by the position potentiometers 38,58 and the signal from the Z-axis transducer 32 are communicated to a recorder control 62 of an X-Y recording device via leads 33, 39, and 57.

The X-input of the recorder control 62 receives directly the X-axis information via lead 57 from the scan to control the X-axis recording of the X-Y recording device. The Y-input of the recorder control has one terminal connected to the table position potentiometer 38 via lead 39 and the other terminal connected to the vertical or Z-axis information from transducer 32 via lead 33. This combination causes the Y-axis recording of the X-Y recording device to be a composite of the Y-axis of Z-axis scans of the configuration and reduces the three-dimensional configuration into a two-dimensional graphic image that appears to be three-dimensional. Of course it is also possible to combine the Z-axis information with the X-axis input to form a two-dimensional graphic recording.

During the retrace of the X-axis scanning the command module 64 communicates to the pen lift terminal of the recorder control 62 via lead 61 to stop writing until the micro-stylus is reset for a scan. The operation of the scanning system is more fully described in the before-referenced Wilson Patent.

Although the recording device described hereinabove is a preferred form for the generation of signals for recording on the X-Y recorder device it is understood that other devices could be used to accomplish the same task. For example, a computerized optical scanner could be substituted for the mechanical scan of the system illustrated. Any graphical system that represents a three-dimensional object with hidden contours in a two-dimensional graphical form by topographical scanning can be utilized.

The X-Y recording device includes the recorder control 62, a recorder table 68, and a movable mounting bar 74. On the movable mounting bar 74 a pen station 76 is transported along the ordinate axis of the recorder table. The pen station 76 is controlled to execute X-axis scanning along the mounting bar to provide the two axis motion of the recording device.

A recording medium 72 is attached to the mounting table 68 for graphically recording motions of the pen station 76. Attached to a boundary 70 of the recording medium is a generally rectangular shaped electrode 84. The electrode 84 is connected to one terminal of a write power supply 66 through a lead 86 and a resistor 85. The other terminal of the power supply is connected to a stylus connection 80 through a lead 82.

These connections provide a writing potential between the recording medium 72 and stylus connection 80. The writing potential produces an arc between the writing stylus and the recording medium at the point of contact. The arc will erode or vaporize the surface of the recording medium 72 to leave a visible mark such as at 73.

Figure 2:
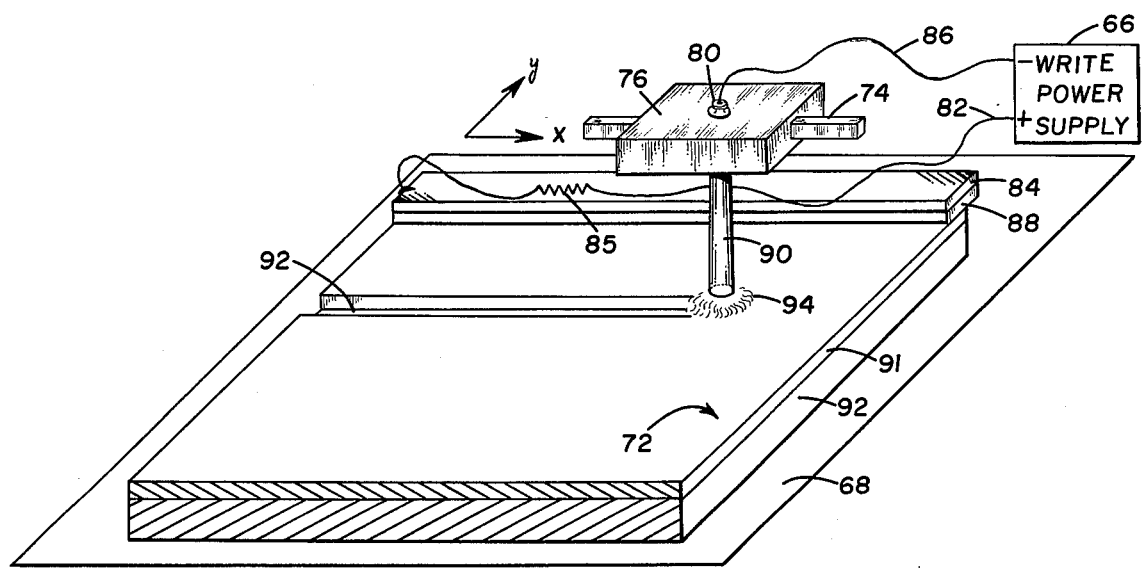
FIG. 2 is an enlarged fragmentary view of part of the recording surface for the apparatus illustrated in FIG. 1.

The recording process is more easily understood by reference to FIG. 2 where a fragment of the recording medium 72 is illustrated on the recording table 68. The recording medium 72 comprises a base layer 92 and an overlayer 91. Preferably, the overlayer is generally conductive and of a contrasting shade to the base layer 92. The base layer 92 can be substantially insulative and thicker than the overlayer 91 to provide support. A preferred recording medium of this general description is a metalized paper ESP-18 made by Nicolet Corporation of De Pere, WI. However, many of the other generally available metalized recording papers will also work.

A conducting stylus 90 inserted in stylus connection 80 is the writing instrument of the system. As the stylus is moved into proximity with the overlayer 91 an arc 94 forms because of the potential difference between the two conductors. The arc 94 erodes or vaporizes the overlayer into a channel of similar shape to the stylus 90 to expose the contrasting base layer 92 beneath and produce a record trace. The channel formed produces an open circuit at the point of contact with the stylus and a visible line or record trace as the scan proceeds.

Alternatively, the stylus 90 may touch the overlayer 91 to produce the arc and a momentary flow of current to erode the overlayer. The stylus pressure or distance adjustment of the X-Y recorder device is set to accommodate the line thickness desired and to produce a visible trace. The heavier the pressure the thicker the final output trace will be to a maximum when the full stylus width will be recorded.

Similarly, the shape of the stylus is not critical to the operability of the invention. Generally, a cylindrical stylus of approximately 0.008 inch diameter has been used to provide an advantageous result. However, heavier or lighter styli or those of different geometry may be used to provide correspondingly heavier or lighter traces or scans.

The potential employed between the stylus 90 and the writing medium 72 is preferably D-C and of the range of ±30–60 volts but the effect will occur at higher and lower voltages. Alternating current could further be used as the effect is not polarity dependent.

A resistor 85 is used as a current limiter to protect the power supply 66 from a direct short circuit. A distributed resistance 88 is also employed as a base for the electrode 84 to decrease burn off effects directly under the electrode and retain continuity with the recording medium 72. The resistance 88 is preferably a carbon filled paper or the like of sufficient conductivity to carry the current passing between the electrode 84 and the stylus 90.

U.S. patents describing recording by arc eroding an overlayered medium are: Nos. 2,808,345, 2,687,361 issued to E. Traub; 2,833,677 issued to Baumlein; 3,074,066 issued to Conerly; 3,411,948 issued to Reis; 3,419,866 issued to Ortlieb; 3,758,749 issued to J. Bolger, Jr.; and 2,836,479 issued to E. Traub et al.

Figure 3:
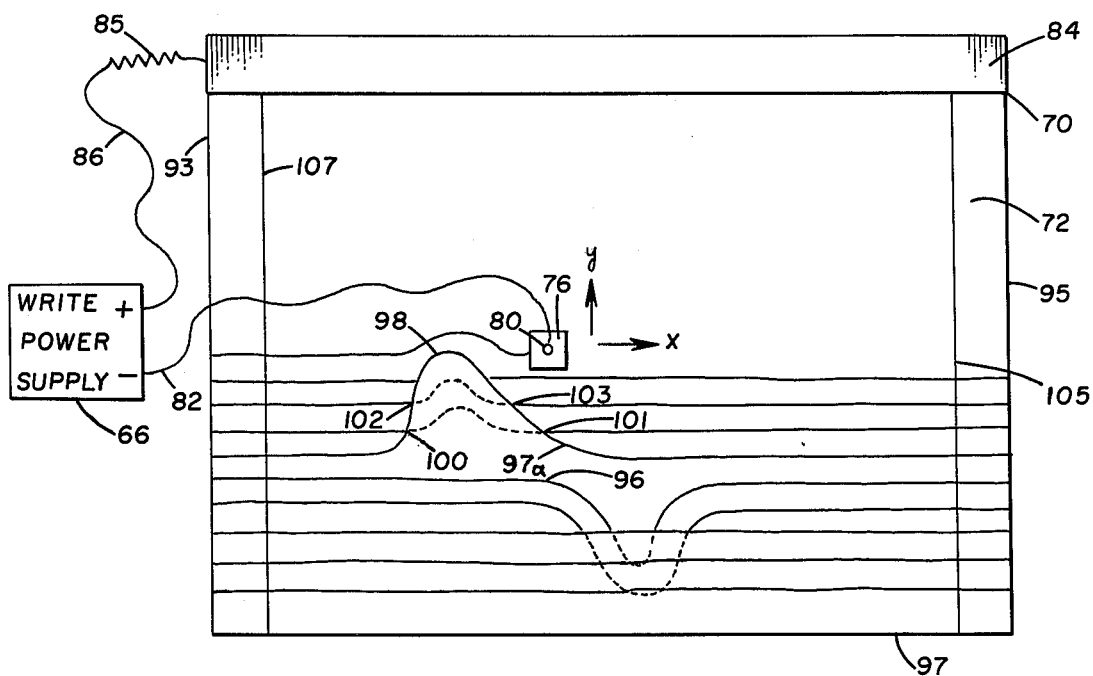
FIG. 3 is a representative illustration of the writing technique used on the recording surface for the apparatus illustrated in FIG. 1.

The method for graphically recording a three-dimensional relief configuration with hidden contours on a two-dimensional recording medium will now be more fully described with reference to FIG. 3.

Each scan of the micro-stylus of FIG. 1 will produce a synchronized writing scan of the pen station 76 moving the stylus 90 to record the transition. The lateral scan on the recording medium 72 will begin at one edge 93, illustrated as the left edge in the drawing, and continue completely across the recording medium to the opposite edge 95. The ordinate scanning direction is from a boundary 97 opposite to the boundary 70 to which the electrode 84 is connected. It is important that complete lateral scans are used to electrically isolate previous recorded areas and the boundary opposite the electrode 84 be used to insure continuity in nonrecorded areas. In the figure this scanning is seen to take place in the positive X and positive Y direction. However it should be understood that the electrode 84 could be placed at any of the boundaries of the medium with a corresponding change in scan direction, i.e., always toward the electrode 84 and laterally from edge to edge.

The complete lateral scan lines, for example 96 and 97a, produce open circuits between the stylus 90 and the electrode 84, whenever stylus 90 crosses a previously written scan line. When a complete lateral transversal from edge 93 to edge 95 is made by the stylus, the areas between the resulting scan lines are also open circuited relative to electrode 84. Consequently, when a scan line begins to overwrite a previously written line, such as line 96 would do because of a negative Z-axis movement by the transducer (shown as phantom), the stylus will enter an open circuited area below the previously written scan line. The circuit connecting stylus 90 to electrode 84 is broken; so, the stylus will not write.

Likewise, the peak caused by scan 97a will not be obscured by subsequent scans as the stylus 90 will record until its entry into the open circuited area between scans 96, 97a at 100,102, and not mark again until its departure from the area at 101,103. The actual excursion along the Z-axis by the transducer is illustrated by dotted line connecting the entry point 100 and departure point 101 of a subsequent trace.

If it is preferred to use less than all the recording medium, parallel lines 105, 107 can be scribed in the medium 72 to define a recording area between them. Thus, the stylus 90 need not extend out to the boundries 93, 95 but merely to the area boundries encompassed by lines 105, 107. This is useful if an area less than a full piece of the recording medium is to be recorded on.

Advantageously, it is seen the technique prevents a previously recorded scan trace from being overwritten and permits a clear picture of the configuration as a topographical record.

Figure 4A:
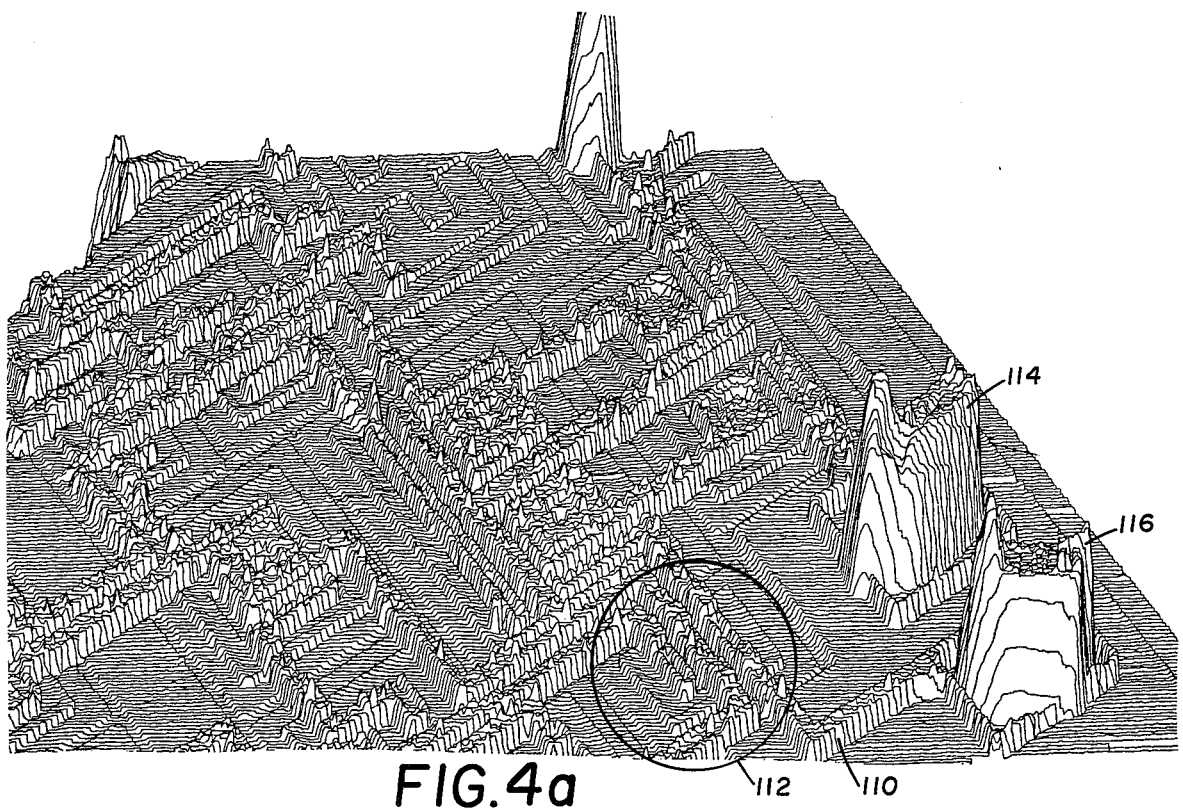
FIG. 4a is a topographic recording of a microcircuit surface in accordance with the invention.
Figure 4B:
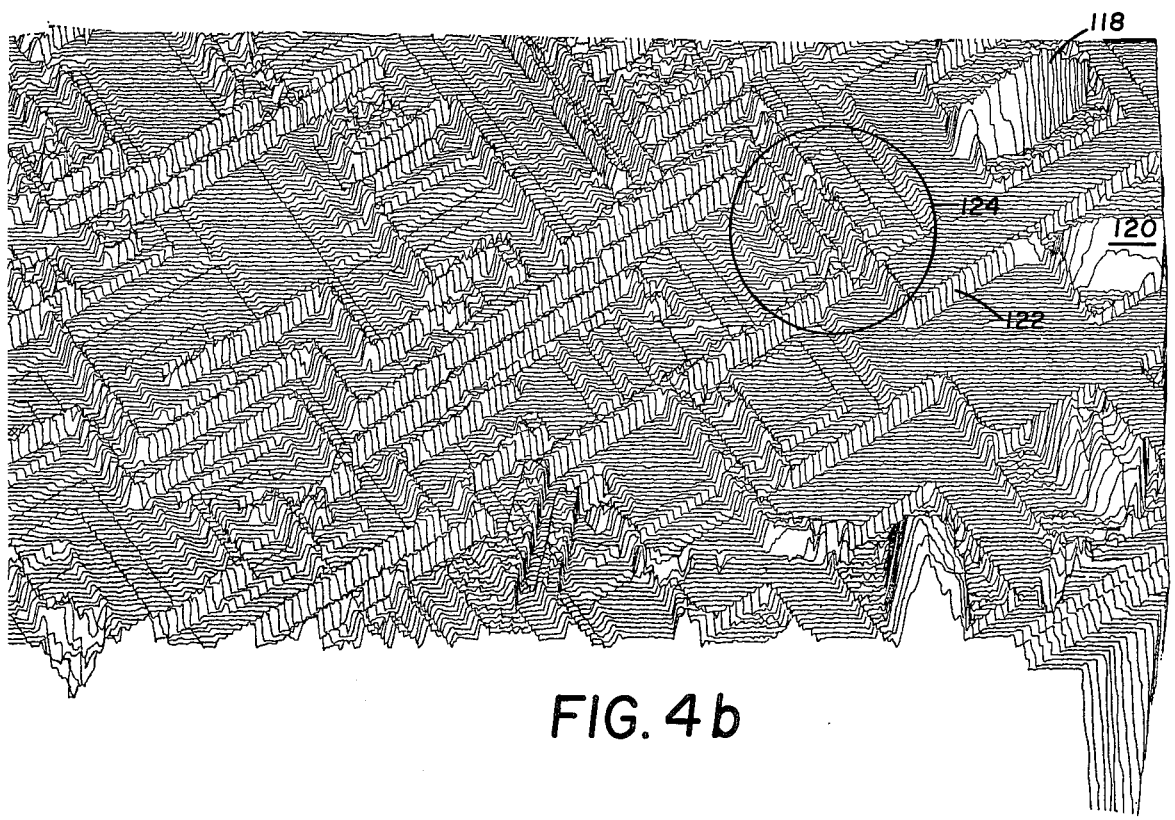
FIG. 4b is a topographic recording of the microcircuit surface illustrated in FIG. 4a with inversion according to one aspect of the invention.

If only one recording of a surface were made it is evident that the information suppressed as hidden lines would be lost. However, it is possible to recover substantially all of such information by recording in the manner hereinbefore described and by inverting the recording parameters of the recording device and/or changing the scan direction. FIGS. 4a and 4b illustrate the recovery of such information by scanning in more than one direction and inverting the recording parameters. The FIG. 4a illustrates a section of a microcircuit surface that has been graphically recorded by the hidden line technique according to the invention. It can be seen in the figure that the connective conductive areas of the circuitry appear as ridges 110 and the active areas appear as more generally flattened mesa areas 112. The large peaks 114,116 are terminal connections that seem to be placed on pads. The investigation of the shape of these peaks would be difficult if they were subject to draw through effects. However, it is seen that these aspects of the microcircuit clearly stand out and are readily decipherable by suppressing the hidden lines according to the invention.

FIG. 4b illustrates another view of the same area as FIG. 4a. The peaks 114,116, the ridges 110, and the mesa areas 112 have been inverted. The scan direction on the recorder has been reversed to scan in the −Y direction instead of +Y. Of course this further requires placing the electrode 84 at the bottom of the recording medium 72 instead of the top as illustrated in FIG. 1. FIG. 4b must be viewed from the top looking down. Thus, the peaks 114,116 appear as deep valleys 118,120, respectively, the ridges 110 appear as channels 122, and the mesa areas 112 appear as depressions 124. This perspective permits a view behind the peaks 114,116 which was suppressed in the first view. By using different combinations of scan directions, amplifications, and inversions a relief configuration may be entirely recorded in a clear and understandable manner without any substantial information loss.

While the preferred embodiments of the invention have been disclosed, it will be understood that various modifications obvious to one skilled in the art can be made thereto without departing from the spirit and scope of the invention as covered by the appended claims.

What is claimed is:

1. In a method for providing a two-dimensional graphic display of a three-dimensional surface of an object, the method having the steps of drawing a micro-stylus transducer sequentially over the surface along a first plurality of spaced, horizontal scan lines while simultaneously measuring movement of the micro-stylus in the vertical direction orthogonal to the direction of the scan lines, the improvement comprising:

providing an arc erodable, electrically conductive recording medium having a recording surface;

applying an electrical potential to said medium along a first boundary thereof;

providing an electrically conductive writing stylus;

applying a different electrical potential to said writing stylus so that a writing potential is developed between said writing stylus and said medium;

scanning said writing stylus sequentially across said medium along a further plurality of horizontal scan lines corresponding to said first plurality of horizontal scan lines, said scanning beginning from a second boundary of said medium spaced from said first boundary, so that each one of said further plurality of scan lines is spaced from said first boundary and is closer to said first boundary than the previous scan line; and during each sequential scan of said writing stylus across said medium, displacing said writing stylus in the horizontal direction orthogonal to the direction of said scan line by an amount proportional to movement measured by the micro stylus in the vertical direction on the surface of the object, whereby each scan of said writing stylus arc erodes said recording medium to produce a record trace, thereby providing an open circuit between said first boundary and the portion of said medium opposite said record trace from said first boundary; and thereby further preventing the record trace produced during one scan of said writing stylus from overwriting the record trace produced by the previous scan.

2. In an apparatus for providing a two-dimensional graphic display of a three-dimensional surface of an object, the apparatus including a micro-stylus transducer and means for drawing the transducer sequentially over the surface along a first plurality of spaced, horizontal scan lines to simultaneously measure movement of the micro-stylus in the vertical direction orthogonal to the scan lines, the improvement comprising:

an arc erodable, electrically conductive recording medium having a recording surface;

means for applying an electrical potential to said medium along a first boundary thereof;

an electrically conductive writing stylus;

means for applying a different electrical potential to said writing stylus so that a writing potential is developed between said writing stylus and said medium;

means for scanning said writing stylus sequentially across said medium along a further plurality of horizontal scan lines, said scanning beginning from a second boundary of said medium spaced from said first boundary so that each one of said further plurality of scan lines is spaced from said first boundary and is closer to said first boundary than the previous scan lines; and means for displacing said writing stylus during each sequential scan in the horizontal direction orthogonal to the direction of each sequential scan line by an amount proportional to the movement measured by the micro stylus in the vertical direction on the surface of the object, whereby each scan of said writing stylus are erodes said recording medium to produce a record trace, thereby providing an open circuit between said first boundary and the portion of said medium opposite said record trace from said first boundary; and thereby further preventing the record trace produced during one scan of said writing stylus from overwriting the record trace produced by the previous scan.

* * * * *